Patented Apr. 18, 1944

2,346,780

UNITED STATES PATENT OFFICE 2,346,780

FUEL TREATING AGENT

John W. Orelup, Short Hills, N. J.

No Drawing. Application December 8, 1941,
Serial No. 422,107

14 Claims. (Cl. 44—59)

This invention relates to improvements in the coloring of petroleum products particularly relatively colorless petroleum products used as fuels.

The coloring of petroleum products, particularly gasoline, has been resorted to distinguish grades, identify origins, mark the presence of added materials and in some jurisdictions to indicate tax free fuels. Colors are added directly or in combination with other added materials so that problems of solubility are presented.

In my co-pending application Serial No. 319,552, filed February 17, 1940, now Patent No. 2,265,189 I have disclosed the use of diphenyl as a standardizing material for use with dyestuffs or other materials added to petroleum fuels for standardizing purposes. I have discovered that certain derivatives of diphenyl containing as their characteristic structural feature the diphenyl nucleus, that is, two phenyl groups directly joined, which derivatives are not water soluble or acidic, are highly useful for the purpose of solving solubility problems which arise between dyes, gasolines and other fuel additive materials because of their property of increasing the rate of solution of the dyes in treated or untreated fuel to a marked extent, so that the dyes may be used at proper concentrations in the fuel without the use of an intermediate solvent and without leaving a residue of undissolved dye in the fuel. These compounds consist of the mono and poly substituted alkyl derivatives of diphenyl itself and include all such substitution products wherein the substitution takes place at one of the unsubstituted positions of either of the phenyl groups making up the diphenyl molecule.

Among these compounds I may include the methyl, ethyl, propyl, iso-propyl, butyl, iso-butyl, amyl, iso-amyl derivatives of diphenyl as well as mono-, di-, and poly-substituted compounds having one or more of these substituted groups. Preference may be given to those compounds which are solid at room temperature, for example, para phenyl toluene (4-methyl diphenyl) melting point 49–50° C., para para ditolyl (4.4' dimethyl diphenyl) melting point 122° C., dimesityl (2,4,6,2',4',6',hexa methyl diphenyl), melting point 100° C., and amyl diphenyl.

These compounds may be prepared by treating the brominated alkyl benzols with sodium, for example, para-brom toluene is treated with sodium to give para-para ditolyl.

I have also found useful the halogen derivatives of diphenyl particularly the brom and chlorine derivatives and especially the members of this group which are solids at room temperature. These compounds are commonly marketed with the contained percentage of chlorine designated and I have found, for example, that the chlorinated diphenyl containing approximately 60% of chlorine is especially useful as it is a pulverizable resinous material and confers enhanced solubility upon fuel soluble dyes, particularly ditoluido anthraquinones, permitting use of considerably less dye to obtain the same color heretofore obtained. It is not necessary, however, that the material be solid at room temperature as for example diphenyl containing approximately 42% of chlorine is a liquid and is useful in obtaining high concentration of dyestuff to be used in fuel. This is sometimes especially desirable where a concentrated dye solution is desired to be used in ordinary metering devices for tax marking of fuel. The 4-brom diphenyl compound a solid melting at 89° C. and the 2-brom diphenyl compound at liquid temperature have also been found valuable.

In using these derivatives I add the mixture of dye and substituted diphenyl directed to the fuel; the same will diffuse in the fuel in a short time without special provision for mixing or blending.

These derivatives of diphenyl are also useful in aiding the solution of dye in a small amount of gasoline treating fluid such as commercial ethyl fluid tetraethyl lead, ethylene dibromides and chlorides or the like, the compounds being entirely compatible with the gasoline treating fluids and detracting in no way from the action of these fluids in the fuel.

These derivatives are soluble in petroleum products. They add no deleterious or undesirous components to the fuel and permit accurate standardization of the dye in the fuel which is particularly desirable where a specific shade is desired for tax or other marking purposes. Concentrations as low as 10% of diphenyl derivatives in the dye may be used effectively and higher concentrations may be employed. Increased color strength may often be obtained with the same amount or less dye when these compounds are employed as greater solubility is achieved.

All types of oil soluble dyes which will dissolve in fuels have been found to be benefited by this treatment; anthraquinone dyes are found to be particularly advantageously affected. These compounds include phenylated amino anthraquinones, oxyphenyl amino or amino anthraquinone, all compounds of anthraquinone containing either amino or hydroxy groups, the diaryl amino anthraquinones being particularly advantageously affected.

For example, when 1-4 ditoluido-anthraquinone is mixed with 15% amyl diphenyl and the mixture blended with gasoline, an increase in color strength of from up to 5% occurs. The dye and diphenyl dissolve completely and permanently in the fuel. It will be understood that dyes are commonly used in fuels in the approximate proportions of from two or three to sixteen or twenty ounces of dye in 10,000 gallons of gasoline (70,000 lbs. approximately).

In the case of treated fuels, particularly gasolines treated with commercial ethyl fluid which comprises roughly two-thirds tetraethyl lead and one-third ethylene dibromide and dichloride, a special situation exists in that only a small percentage of dye, such as 5%, is soluble in ethyl fluids in any event. The amount which dissolves while sufficient to identify the ethyl fluid is not enough to render the color of the gasoline sufficiently distinctive to comply with various statutory requirements respecting gasoline containing lead and accordingly it is necessary to add further dye-diphenyl derivative composition to the gasoline after the ethyl fluid saturated with dye-diphenyl derivative combination is added. The following example will serve to illustrate this:

From .5 gm. to 1 gm. of a mixture of 1 gm. of 60% chlorine diphenyl and 3 gms. of 1-4 ditoluido anthraquinone is combined with 28 cc. of ethyl fluid of the approximate composition above set forth. This quantity of ethyl fluid is sufficient to treat about 400 gallons of aviation gasoline. Part of the ethyl fluid-diphenyl composition may be added to the ethyl fluid which is then added to the gasoline and the remainder of the dye diphenyl derivative composition may be added to the gasoline subsequently. A considerably larger quantity of ordinary gasoline may be treated with the quantity of ethyl fluid and the concentration of the dye adjusted if desired.

I have found it useful to employ quantities of such diphenyl derivatives ranging from 10% to 75% of the total of material added to the fuel but quantities above and below these limits have been found to have advantageous effects upon the solubility of the dye and the fuel. Equally good results are obtained by mixing the dye with the diphenyl derivative by grinding the two together or by making a melt with the dyestuff and then grinding.

Examples of other dyes commonly used in coloring gasoline to which this invention may be applied are the amino anthraquinones, 1-5 ditoluido anthraquinone, 1 amino 2-4 ditoluido anthraquinone, 1-4 amido anthraquinone, 1 methyl amido 4 methyl amido anthraquinone, 1 amido 4 hydroxy anthraquinone, 1-4 dianilidio anthraquinone 1-oxy 4 para anilido anthraquinone, 1-5 dianilido anthraquinone, 1 amino 2-4 dianilido anthraquinone. Other dyes also useful for this purpose are amino azobenzol azo beta naphthol, xylidine azo beta naphthylamine, aniline azo dimethyl aniline, and ortho chlor aniline azo phenyl beta naphthylamine.

Numerous other applications of this invention are possible; for example, any dye actually soluble in petroleum products may be used with these diphenyl derivatives with a consequent increase in effective color strength, but of course the greatest benefit of the invention is apparent when the diphenyl derivative is applied to difficultly soluble dyestuffs. Furthermore the more difficultly soluble dyes are aided more in proportion by the use of these compounds and their velocity of solution in fuels is increased considerably more than in the case of the more soluble types of dyes. Examples of dyes which receive maximum benefit are the 1-4 ditoluido anthraquinone, 1 methyl amino 4 toluido anthraquinone and the 1-oxy 4-para toluido anthraquinone.

These compounds appear to have the effect of placing more solid dyestuff in the liquid phase in a two-phase system. It is believed that solutions of large molecule dyes such as are commonly used in petroleum products are not entirely true solutions, but comprise two-phase systems, consisting of the solid dyestuff and the dyestuff dissolved in liquid petroleum. The diphenyl compounds appear to have the effect of permitting more solid undissolved dye to be present in a liquid phase which results in an increase in color strength. Thus the tendency of these compounds in the fuel is to produce a high degree of supersaturation of dye therein.

I claim:

1. A composition of matter for coloring petroleum products comprising a combination of alkyl substituted diphenyl with a dyestuff suitable for coloring petroleum products.

2. A composition of matter for coloring petroleum products comprising the combination of an alkyl substituted diphenyl with an anthraquinone dye.

3. A composition of matter for coloring petroleum products comprising the combination of an alkyl substituted diphenyl with an amino anthraquinone dye.

4. A composition of matter for coloring petroleum products comprising the combination of an alkyl substituted diphenyl with a 1-4 ditoluido anthraquinone.

5. A composition of matter for coloring petroleum products comprising the combination of an alkyl substituted diphenyl with a 1-oxy 4-para toluido anthraquinone.

6. A composition of matter for treating petroleum products comprising ethyl fluid, an alkyl substituted diphenyl and a petroleum soluble dye.

7. A composition of matter for coloring petroleum products comprising a combination of halogen substituted diphenyl with a dyestuff suitable for coloring petroleum products.

8. A composition of matter for coloring petroleum products comprising the combination of halogen substituted diphenyl with an anthraquinone dye.

9. A composition of matter for coloring petroleum products comprising the combination of halogen substituted diphenyl with an amino or substituted amino anthraquinone dye.

10. A composition of matter for coloring petroleum products comprising the combination of halogen substituted diphenyl with a 1-4 ditoluido anthraquinone.

11. A composition of matter for coloring petroleum products comprising the combination of halogen substituted diphenyl with a 1-oxy 4-para toluido anthraquinone.

12. A composition of matter for treating petroleum products comprising ethyl fluid, halogen substituted diphenyl and a petroleum soluble dye.

13. A composition of matter for coloring petroleum products comprising the combination of an oil soluble dye and material selected from the group consisting of halogen substituted diphenyl and alkyl substituted diphenyl.

14. A composition of matter for treating petroleum products comprising ethyl fluid, a petroleum soluble dye, and material selected from the group consisting of halogen substituted diphenyl and alkyl substituted diphenyl.

JOHN W. ORELUP.